United States Patent
Yang

(10) Patent No.: US 10,167,008 B1
(45) Date of Patent: Jan. 1, 2019

(54) STROLLER FRAME

(71) Applicants: SUNNYLOVE BABY PRODUCTS ZHUHAI CO., LTD, Zhuhai, Guangdong Province (CN); Shu-Chen Wang, Zhongshan, Guangdong (CN)

(72) Inventor: Cheng-Fan Yang, Tainan (TW)

(73) Assignees: SUNNYLOVE BABY PRODUCTS ZHUHAI CO., LTD, Zhuhai (CN); Shu-Chen Wang, Zhongshan (CN)

( * ) Notice: Subject to any disclaimer, the term of this patent is extended or adjusted under 35 U.S.C. 154(b) by 0 days.

(21) Appl. No.: 15/894,456

(22) Filed: Feb. 12, 2018

(30) Foreign Application Priority Data

Aug. 10, 2017 (CN) .................... 2017 2 1000465 U

(51) Int. Cl.
*B62B 7/06* (2006.01)
*B62B 9/12* (2006.01)
*B62B 9/20* (2006.01)

(52) U.S. Cl.
CPC ................ *B62B 7/06* (2013.01); *B62B 9/12* (2013.01); *B62B 9/20* (2013.01); *B62B 2205/12* (2013.01); *B62B 2205/23* (2013.01)

(58) Field of Classification Search
CPC .... B62B 7/06–7/105; B62B 9/20; B62B 9/12; B62B 2205/12; B62B 2205/23
See application file for complete search history.

(56) References Cited

U.S. PATENT DOCUMENTS

| 5,181,735 | A | * | 1/1993 | Onishi | B62B 7/08 280/42 |
| 5,472,224 | A | * | 12/1995 | Jane Cabagnero | B62B 7/08 280/42 |
| 5,752,738 | A | * | 5/1998 | Onishi | B62B 7/08 280/642 |
| 5,772,235 | A | * | 6/1998 | Espenshade | B62B 7/123 280/643 |
| 8,894,090 | B1 | * | 11/2014 | Chen | B62B 7/086 280/47.38 |
| 2003/0080536 | A1 | * | 5/2003 | Hartenstine | B62B 7/06 280/642 |
| 2003/0111826 | A1 | * | 6/2003 | Hou | B62B 7/06 280/650 |
| 2005/0098981 | A1 | * | 5/2005 | Chang | B62B 7/10 280/642 |
| 2005/0098982 | A1 | * | 5/2005 | Huang | B62B 7/08 280/642 |

(Continued)

*Primary Examiner* — Erez Gurari
(74) *Attorney, Agent, or Firm* — Rabin & Berdo, P.C.

(57) ABSTRACT

A stroller frame has a body, two front wheel assemblies, a seat supporting mechanism, and a rear wheel folding mechanism. The two front wheel assemblies are respectively and pivotally disposed on the body. The seat supporting mechanism is moveably disposed below a seat plate of the body. The rear wheel folding mechanism is disposed on a rear side of the body and has two rear wheel assemblies and two linkage assemblies. The two rear wheel assemblies are moveably disposed on a first transverse rod of the body. The two linkage assemblies are respectively disposed on two ends of a second transverse rod of the body. When the stroller frame is folded, two rear wheels of the two rear wheel assemblies move between two front wheels of the two front wheel assemblies to decrease the overall width and volume of the folded stroller frame.

12 Claims, 10 Drawing Sheets

(56) References Cited

U.S. PATENT DOCUMENTS

| | | | |
|---|---|---|---|
| 2006/0125210 A1* | 6/2006 | Fox | B62B 7/08 |
| | | | 280/642 |
| 2008/0224450 A1* | 9/2008 | Van der Vegt | B62B 7/068 |
| | | | 280/642 |
| 2014/0021697 A1* | 1/2014 | Kikui | B62B 9/20 |
| | | | 280/642 |
| 2014/0183843 A1* | 7/2014 | Iftinca | B62B 7/06 |
| | | | 280/647 |
| 2014/0346746 A1* | 11/2014 | Li | B62B 9/085 |
| | | | 280/47.38 |
| 2017/0144687 A1* | 5/2017 | Li | B62B 7/062 |
| 2018/0065654 A1* | 3/2018 | Chen | B62B 7/062 |
| 2018/0141578 A1* | 5/2018 | Yuan | B62B 7/044 |
| 2018/0215405 A1* | 8/2018 | Lin | B62B 7/06 |
| 2018/0229751 A1* | 8/2018 | Yabuuchi | B62B 9/08 |

* cited by examiner

STROLLER FRAME

BACKGROUND OF THE INVENTION

1. Field of the Invention

The present invention relates to a stroller frame, and more particularly to a stroller frame that can be folded and expanded.

2. Description of Related Art

A conventional stroller frame has a body having multiple foldable joints. Two front wheels are respectively disposed on two sides of a front end of a bottom of the body. Two rear wheels are respectively disposed on two sides of a rear end of a bottom of the body. The conventional stroller frame can be folded and expanded by the foldable joints of the body. When the conventional stroller frame is expanded, a baby or a toddler can be seated in the conventional stroller frame, and then the conventional stroller frame can be pushed to move. When the conventional stroller frame is folded, an occupied space of the conventional stroller frame could be decreased for ease in storage and carriage.

For improving stability and steering flexibility of the conventional stroller frame, a distance between the two rear wheels is larger than a distance between the two front wheels. The conventional stroller frame is folded by the foldable joints. After the conventional stroller frame is folded, the two rear wheels are located behind the two front wheels or are located at the outer sides of the two front wheels. Therefore, the overall width of the folded conventional stroller frame is still large. The overall volume of the folded conventional stroller frame is hard to decrease and occupies much space. In the conventional stroller frame, a bearing mechanism for the baby/toddler to be seated is supported by two linkage assemblies at two sides of the conventional stroller frame respectively. Thus, a capacity of the bearing mechanism is inadequate with the two linkage assemblies.

To overcome the shortcomings, the present invention tends to provide a stroller frame to mitigate or obviate the aforementioned problems.

SUMMARY OF THE INVENTION

The main objective of the invention is to provide a stroller frame that may solve the problems that the overall width of the conventional stroller frame when folded is still large, and the overall volume of the folded conventional stroller frame is hard to decrease and occupies much space.

The stroller frame has a body, two front wheel assemblies, a seat supporting mechanism, and a rear wheel folding mechanism.

The body has a front end having two sides, a rear side, a front wheel bracket, two first joint assemblies, a seat supporting bracket, a seat plate, two inclined rods, two second joint assemblies, a handle, a first transverse rod, a second transverse rod, and a linkage shaft.

The front wheel bracket has a front, a rear, a top, and two top portions. The two top portions are disposed at a spaced interval and are inclined toward the top of the front wheel bracket from the front of the front wheel bracket to the rear of the front wheel bracket. The two first joint assemblies are respectively disposed on the two top portions of the front wheel bracket. The seat supporting bracket is disposed on the two first joint assemblies. The seat plate is disposed on the seat supporting bracket and has a middle section and a rear section. The two inclined rods are respectively disposed on the two first joint assemblies. The two second joint assemblies are respectively disposed on the two inclined rods. The handle is disposed across the two second joint assemblies and has two longitudinal portions and a transverse portion. The two longitudinal portions are respectively disposed on the two second joint assemblies. The transverse portion is disposed across the two longitudinal portions and has an operating assembly disposed on the transverse portion. The operating assembly controls the two first joint assemblies and the two second joint assemblies. The first transverse rod is disposed across the two first joint assemblies below the seat supporting bracket. The second transverse rod is disposed across the two top portions of the front wheel bracket below the seat supporting bracket, is parallel with the first transverse rod, is located ahead and below the first transverse rod, and has two ends. The linkage shaft is disposed below the rear section of the seat plate, and is linkingly connected between the two first joint assemblies.

The two front wheel assemblies are respectively and pivotally disposed on the two sides of the front end of the body. Each front wheel assembly has a front wheel seat and a front wheel. The front wheel seat is pivotally disposed on the body. The front wheel is pivotally disposed on the front wheel seat.

The seat supporting mechanism is moveably disposed below the seat plate of the body, and has a first arc-shaped plate, a second arc-shaped plate, and a supporting plate. A top end of the first arc-shaped plate is pivotally disposed on the middle section of the seat plate. A bottom end of the second arc-shaped plate is pivotally disposed on the second transverse rod. A top end of the supporting plate is connected to the linkage shaft. A bottom end of the first arc-shaped plate, a top end of the second arc-shaped plate, and a bottom end of the supporting plate are connected with each other by a pivoting shaft.

The rear wheel folding mechanism is disposed on the rear side of the body and has two rear wheel assemblies and two linkage assemblies.

The two rear wheel assemblies are moveably disposed on the first transverse rod of the body. Each rear wheel assembly has a rear wheel seat, a rear wheel, a connecting rod, and a connecting seat. The rear wheel seat has a top portion and a side. The rear wheel has a wheel shaft pivotally disposed on the side of the rear wheel seat. The wheel shaft has a central line defined along a longitudinal direction of the wheel shaft. The connecting rod is securely disposed on the top portion of the rear wheel seat and has a longitudinal direction, a central line defined along the longitudinal direction of the connecting rod, and a top end. An angle is defined between the central line of the connecting rod and the central line of the wheel shaft and is an acute angle. The connecting seat is pivotally disposed on the top end of the connecting rod, is obliquely and securely mounted on the first transverse rod, and has a pivoting portion, a fixing portion, and a stopping portion. The pivoting portion is pivotally disposed on the top end of the connecting rod by a pivoting pin and has a top end and a bottom end. The fixing portion is formed on the top end of the pivoting portion. The connecting seat is securely mounted on the first transverse rod by the fixing portion. The stopping portion is formed on the bottom end of the pivoting portion, and is located behind the top end of the connecting rod for limiting a backward rotating angle between the connecting rod and the connecting seat.

The connecting seats of the two rear wheel assemblies are inclined outwardly from top to bottom of the body. The two connecting rods are symmetrical and are splayed from top to bottom of the body. When the two rear wheel assemblies are expanded, a distance between the two rear wheels is larger than a distance between the two front wheels. When the two rear wheel assemblies are folded, the two rear wheels move between the two front wheels by the connecting seats inclined and the two connecting rods splayed.

The two linkage assemblies are respectively disposed on the two ends of the second transverse rod, and are respectively located out of and connected to the connecting rods of the two rear wheel assemblies. Each linkage assembly has a first linkage rod, a second linkage rod, a first multi-directional connector, and a second multi-directional connector. An end of the first linkage rod is connected to the second transverse rod. The other end of the first linkage rod is combined to the first multi-directional connector to connect to an end of the second linkage rod. The other end of the second linkage rod is combined to the second multi-directional connector to connect to a middle section of a corresponding one of the connecting rods.

The rear wheel folding mechanism is disposed on the rear side of the body. The two rear wheel assemblies are foldable and are obliquely and symmetrically disposed on the first transverse rod of the body. The two linkage assemblies are connected between the connecting rods of the two rear wheel assemblies and the second transverse rod of the body. When the stroller frame is expanded, the connecting seats are obliquely mounted and guide the connecting rods to splay from top to bottom of the body. The distance between the two rear wheels is larger than a distance between the two front wheels. The two linkage assemblies are expanded simultaneously to support the splayed connecting rods. In addition, the seat supporting mechanism is foldable, is located at the body, and is connected between a bottom of the seat plate, the first transverse rod, and the second transverse rod to form a foldable multi-point supporting mechanism to provide stable auxiliary strength to the seat plate. The rear wheel folding mechanism is spread steadily. The stroller frame can be pushed and moves steadily.

When the stroller frame is folded, the two linkage assemblies are folded and drive the connecting rods of the two rear wheel assemblies to respectively rotate along the pivoting pins of the pivoting portions of the connecting seats for moving toward the front wheel bracket. In each one of the two linkage assemblies, the first multi-directional connector is connected to the first linkage rod and the second linkage rod. The second multi-directional connector is connected to the second linkage rod and a corresponding one of the two connecting rods.

When the two rear wheel assemblies are folded, the connecting rods are guided and move toward a middle direction of the rear wheel folding mechanism. The two rear wheels can move to and be disposed between the two front wheels. The overall width and volume of the folded stroller frame are decreased to overcome the problems that the two rear wheels of the conventional folded stroller frame are located at outer sides of the two front wheels of the conventional folded stroller frame, the overall width of the conventional stroller frame is still large when folded, and the overall volume of the folded conventional stroller frame is hard to decrease and occupies much space. In addition, in the folding process of the stroller frame, the linkage shaft is driven by the first joint assemblies for driving the supporting plate to pull the seat supporting mechanism to fold automatically.

Other objects, advantages and novel features of the invention will become more apparent from the following detailed description when taken in conjunction with the accompanying drawings.

DETAILED DESCRIPTION OF PREFERRED EMBODIMENT

Figure 1:
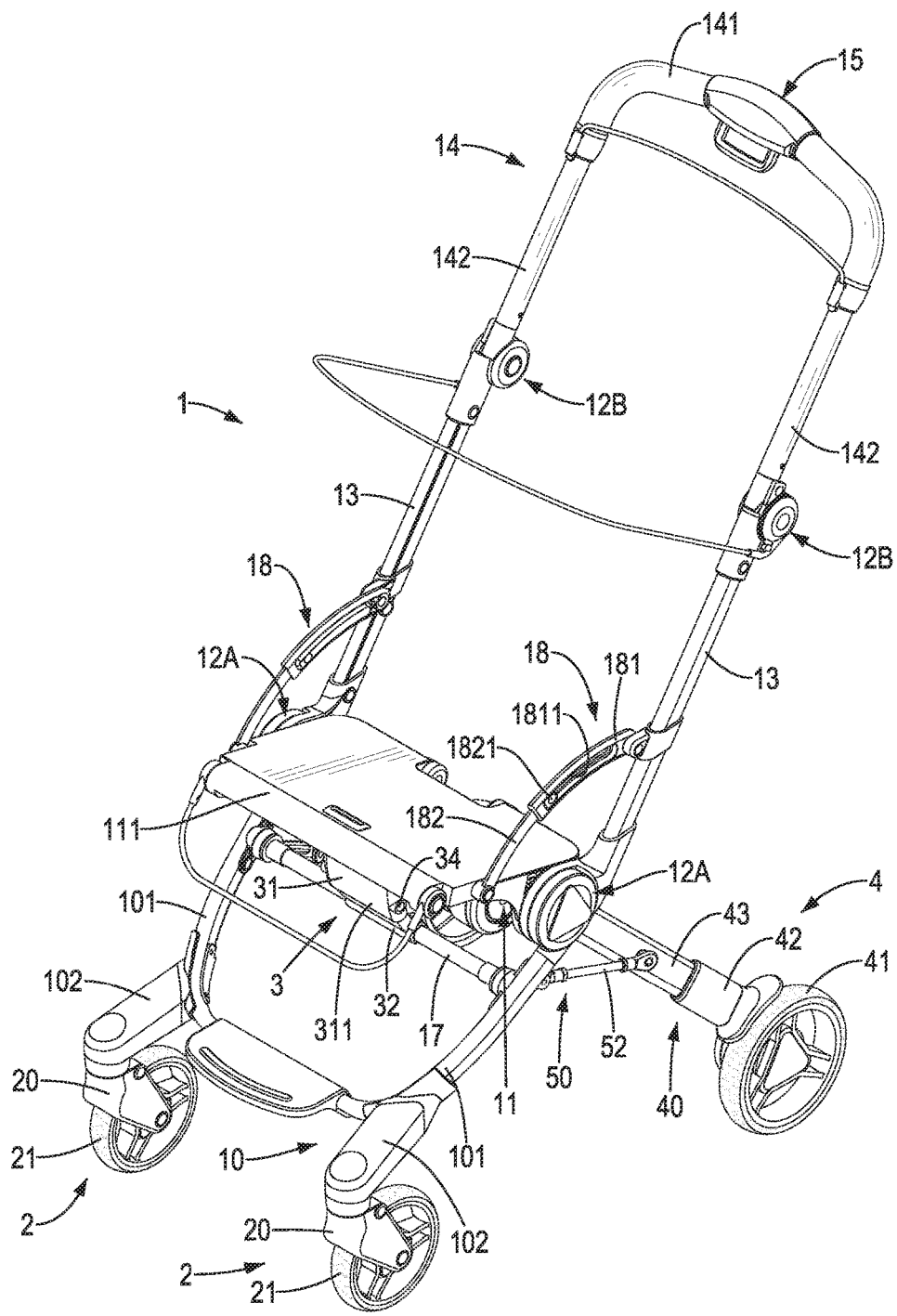
FIG. 1 is a perspective view of a stroller frame in accordance with the present invention.

With reference to FIGS. 1 to 3, and 5, a stroller frame in accordance with the present invention comprises a body 1, two front wheel assemblies 2, a seat supporting mechanism 3, and a rear wheel folding mechanism 4.

With reference to FIGS. 1 to 5, the body 1 has a front end having two sides, a rear side, a front wheel bracket 10, two first joint assemblies 12A, a seat supporting bracket 11, a seat plate 111, two inclined rods 13, two second joint assemblies 12B, a handle 14, a first transverse rod 16, a second transverse rod 17, and a linkage shaft 121.

The front wheel bracket 10 has a front, a rear, a top, and two top portions 101. The two top portions 101 are disposed at a spaced interval and are inclined toward the top of the front wheel bracket 10 from the front of the front wheel bracket 10 to the rear of the front wheel bracket 10. The two first joint assemblies 12A are respectively disposed on the two top portions 101 of the front wheel bracket 10. The seat supporting bracket 11 is disposed on the two first joint assemblies 12A. The seat plate 111 is disposed on the seat supporting bracket 11 and has a middle section and a rear section. The two inclined rods 13 are respectively disposed on the two first joint assemblies 12A. The two second joint assemblies 12B are respectively disposed on the two inclined rods 13.

The handle 14 is disposed across the two second joint assemblies 12B and has two longitudinal portions 142 and a transverse portion 141. The two longitudinal portions 142 are respectively disposed on the two second joint assemblies 12B. The transverse portion 141 is disposed across the two longitudinal portions 142 and has an operating assembly 15 disposed on the transverse portion 141. The operating assembly 15 controls the two first joint assemblies 12A and the two second joint assemblies 12B. The first transverse rod 16 is disposed across the two first joint assemblies 12A below the seat supporting bracket 11. The second transverse rod 17 is disposed across the two top portions 101 of the front wheel bracket 10 below the seat supporting bracket 11, is parallel with the first transverse rod 16, is located ahead and below the first transverse rod 16, and has two ends. The linkage shaft 121 is disposed below the rear section of the seat plate 111, and is linkingly connected between the two first joint assemblies 12A.

The two first joint assemblies 12A and the two second joint assemblies 12B are controlled by the operating assembly 15. The two first joint assemblies 12A have both clutch-controlling and rotation functions. The two second joint assemblies 12B also have both clutch-controlling and rotation functions. The body 1 can be folded and expanded. The first joint assemblies 12A, the second joint assemblies 12B, and the operating assembly 15 can be selected from the known folding joint assemblies.

With reference to FIGS. 1, 3, 4, and 5, the body 1 has two retractable supporting assemblies 18. Each retractable supporting assembly 18 is connected between one of the two inclined rods 13 and the seat supporting bracket 11, and has a first supporting rod 181 and a second supporting rod 182. The first supporting rod 181 and the second supporting rod 182 are curved rods. An end of the first supporting rod 181 is pivotally disposed on a corresponding one of the two inclined rods 13. An arc-shaped elongated hole 1811 is formed through a side surface of the first supporting rod 181. An end of the second supporting rod 182 is pivotally disposed on a side of the seat supporting bracket 11. The other end of the second supporting rod 182 is moveably connected to the other end of the first supporting rod 181. A limiting element 1821 is disposed on the other end of the second supporting rod 182, and is inserted into the arc-shaped elongated hole 1811 for limiting a relative moving distance between the first supporting rod 181 and the second supporting rod 182.

With reference to FIGS. 1, 3, 4, and 5, the two front wheel assemblies 2 are disposed in front of the front wheel bracket 10 and are respectively and pivotally disposed on the two sides of the front end of the body 10. Each front wheel assembly 2 has a front wheel seat 20 and a front wheel 21. The front wheel seat 20 is pivotally disposed on a bottom-front of one of the front portions 102 of the body 10 for rotating to change a direction of the front wheel seat 20. The front wheel 21 is pivotally disposed on the front wheel seat 20.

With reference to FIGS. 1, 3, 4, and 5, the seat supporting mechanism 3 is moveably disposed on the body 1, is connected to a middle section of a bottom of the seat plate 111, and is connected between the first transverse rod 16 and the second transverse rod 17. The seat supporting mechanism 3 has a first arc-shaped plate 31, a second arc-shaped plate 32, and a supporting plate 33. A top end of the first arc-shaped plate 31 is pivotally disposed on the middle section of the bottom of the seat plate 111. A bottom end of the second arc-shaped plate 32 is pivotally disposed on the second transverse rod 17. A top end of the supporting plate 33 is connected to the linkage shaft 121. A bottom end of the first arc-shaped plate 31, a top end of the second arc-shaped plate 32, and a bottom end of the supporting plate 33 are connected with a pivoting shaft 34. The first arc-shaped plate 31 has a limiting portion 311. The limiting portion 311 is disposed on the bottom end of the first arc-shaped plate 31, is located below the pivoting shaft 34, and is located at an outer side of the top end of the second arc-shaped plate 32 to form a foldable multi-point supporting mechanism.

With reference to FIGS. 2, 3, 5, and 6, the rear wheel folding mechanism 4 is disposed on the rear side of the body 1 behind the front wheels 21. The rear wheel folding mechanism 4 has two rear wheel assemblies 40 and two linkage assemblies 50.

With reference to FIGS. 2, 3, 5, and 6, the two rear wheel assemblies 40 are moveably disposed on the rear side of the body 1. Each rear wheel assembly 40 has a rear wheel seat 42, a rear wheel 41, a connecting rod 43, and a connecting seat 44. The rear wheel seat 42 has a top portion and a side. The rear wheel 41 has a wheel shaft with which the rear wheel is pivotally disposed on the side of the rear wheel seat 42. The wheel shaft has a central line defined on the wheel shaft. The connecting rod 43 is securely disposed on the top portion of the rear wheel seat 42. The connecting rod 43 has a central line and a top end. The central line of the connecting rod 43 is defined along a longitudinal direction of the connecting rod 43. An angle is defined between the central line of the connecting rod 43 and the central line of the wheel shaft and is an acute angle. The connecting seat 44 is pivotally disposed on the top end of the connecting rod 43, is obliquely and securely mounted on the first transverse rod 16 of the body 1, and has a pivoting portion 441, a fixing portion 442, and a stopping portion 443. The pivoting portion 441 is pivotally disposed on the top end of the connecting rod 43 by a pivoting pin and has a top end and a bottom end. The fixing portion 442 is formed on the top end of the pivoting portion 441. The connecting seat 44 is securely mounted on the first transverse rod 16 of the body 1 by the fixing portion 442. The stopping portion 443 is formed on the bottom end of the pivoting portion 441 and is located behind the top end of the connecting rod 43 for limiting a backward rotating angle between the connecting rod 43 and the connecting seat 44.

With reference to FIGS. 2, 3, 5, and 6, the connecting seats 44 of the two rear wheel assemblies 40 are inclined outwardly from top to bottom of the body 1 and are located between the two second joint assemblies 12B of the body 1. The two connecting rods 43 are symmetrical and are splayed from top to bottom of the body 1 by the connecting seats 44, respectively. When the two rear wheel assemblies 40 are expanded, the two connecting rods 43 of the two rear wheel assemblies 40 are inclined and extend from a front-top direction to a rear-bottom direction of the body 1. Spacing between the two connecting rods 43 is progressively increased downwardly. Spacing between bottom ends of the two connecting rods 43 is larger than spacing between the top ends of the two connecting rods 43. A distance between the two rear wheels 41 is larger than a distance between the two front wheels 21. When the two rear wheel assemblies 40 are folded, the distance between the two rear wheels 41 is smaller than the distance between the two front wheels 21. The two rear wheels 41 are moved between the two front wheels 21 by the connecting seats 42 inclined and the two connecting rods 43 splayed.

With reference to FIGS. 2, 3, 5, and 6, the stroller frame has a flexible strap 45. Two ends of the flexible strap 45 are respectively connected to middle sections of the connecting rods 43 of the two rear wheel assemblies 40. An extending range of the two connecting rods 43 is limited by the flexible strap 45. The stroller frame has two locking devices 60. The two locking devices 60 are respectively disposed on the rear wheel seats 42 of the two rear wheel assemblies 40 for selectively locking the two rear wheels 41. A cable 62 is flexible and is connected to the two locking devices 60 to link the two locking devices 60. A pedal 61 is disposed on one of the two locking devices 60 for controlling the two locking devices 60. The two locking devices 60 are linked by the cable 62. The locking devices 60 can be selected from the known locking devices.

With reference to FIGS. 2, 3, 5, and 6, the two linkage assemblies 50 are respectively disposed on the two ends of the second transverse rod 17, are respectively located at outer sides of the connecting rods 43, and are connected to the connecting rods 43 of the two rear wheel assemblies 40. Each linkage assembly 50 has a first linkage rod 51, a second linkage rod 52, a first multi-directional connector 53, and a second multi-directional connector 54. An end of the first linkage rod 51 is connected to the second transverse rod 17. The other end of the first linkage rod 51 is combined to the first multi-directional connector 53 to connect to an end of the second linkage rod 52. The other end of the second linkage rod 52 is combined to the second multi-directional connector 54 to connect to the middle section of a corresponding one of the connecting rods 43.

The first multi-directional connector 53 is connected to the first linkage rod 51 and the second linkage rod 52. The second multi-directional connector 54 is connected to the second linkage rod 52 and a corresponding connecting rod 43. The two rear wheel assemblies 40 can be expanded backwardly and folded forwardly with respect to the body 1. The two rear wheel assemblies 40 can be left-right expanded and folded.

Figure 2:
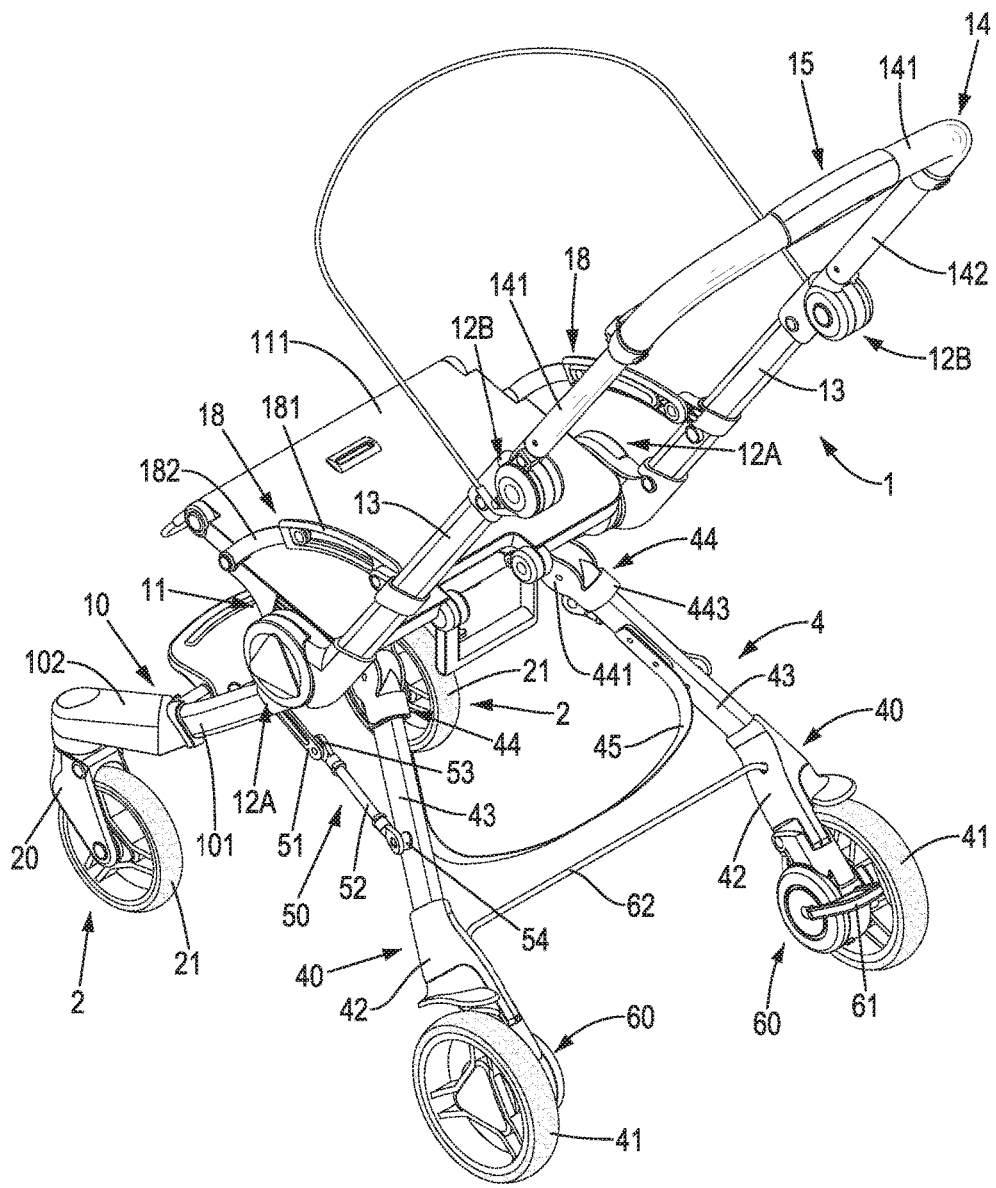
FIG. 2 is another perspective view of the stroller frame in FIG. 1.
Figure 3:
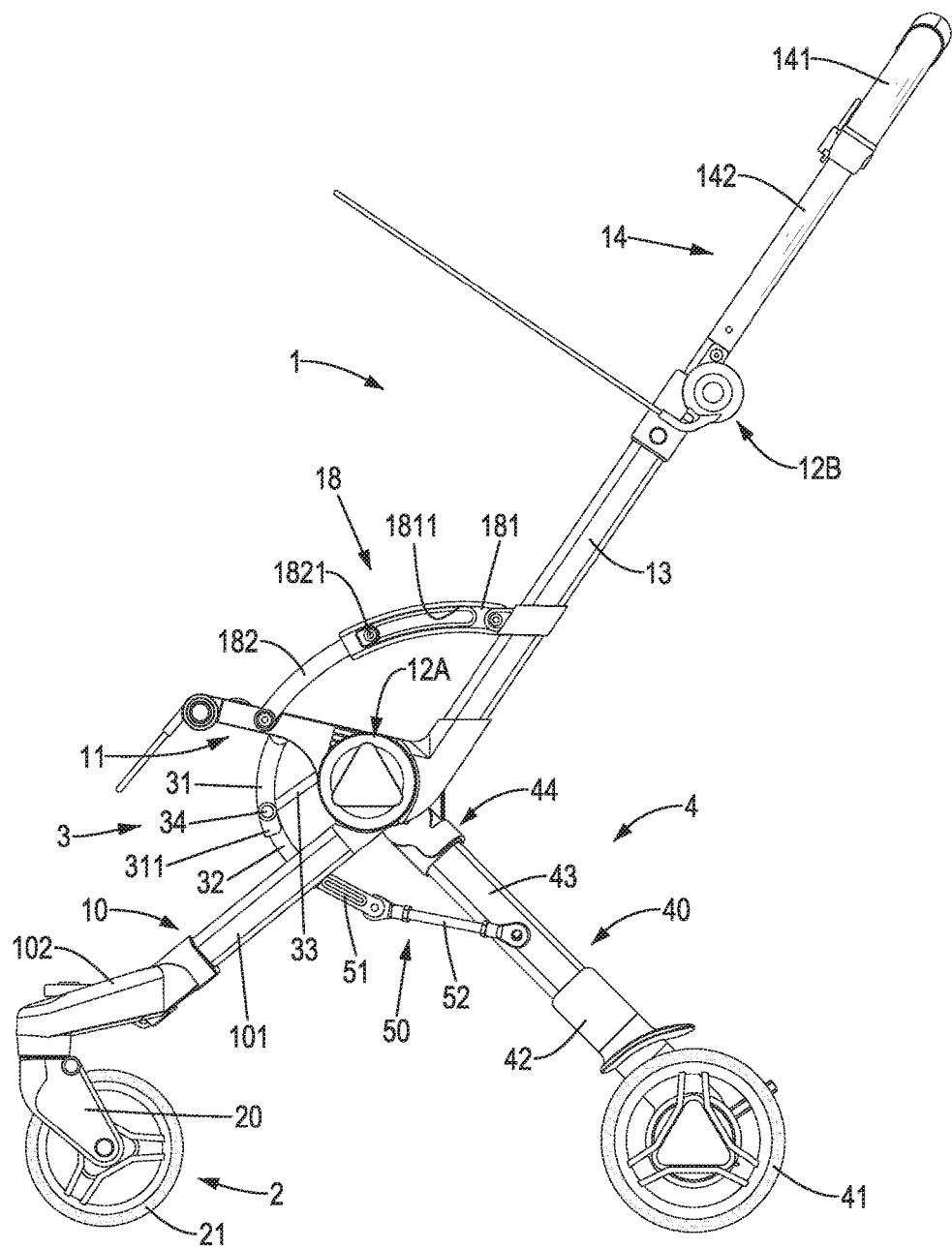
FIG. 3 is a side view of the stroller frame in FIG. 1.
Figure 4:
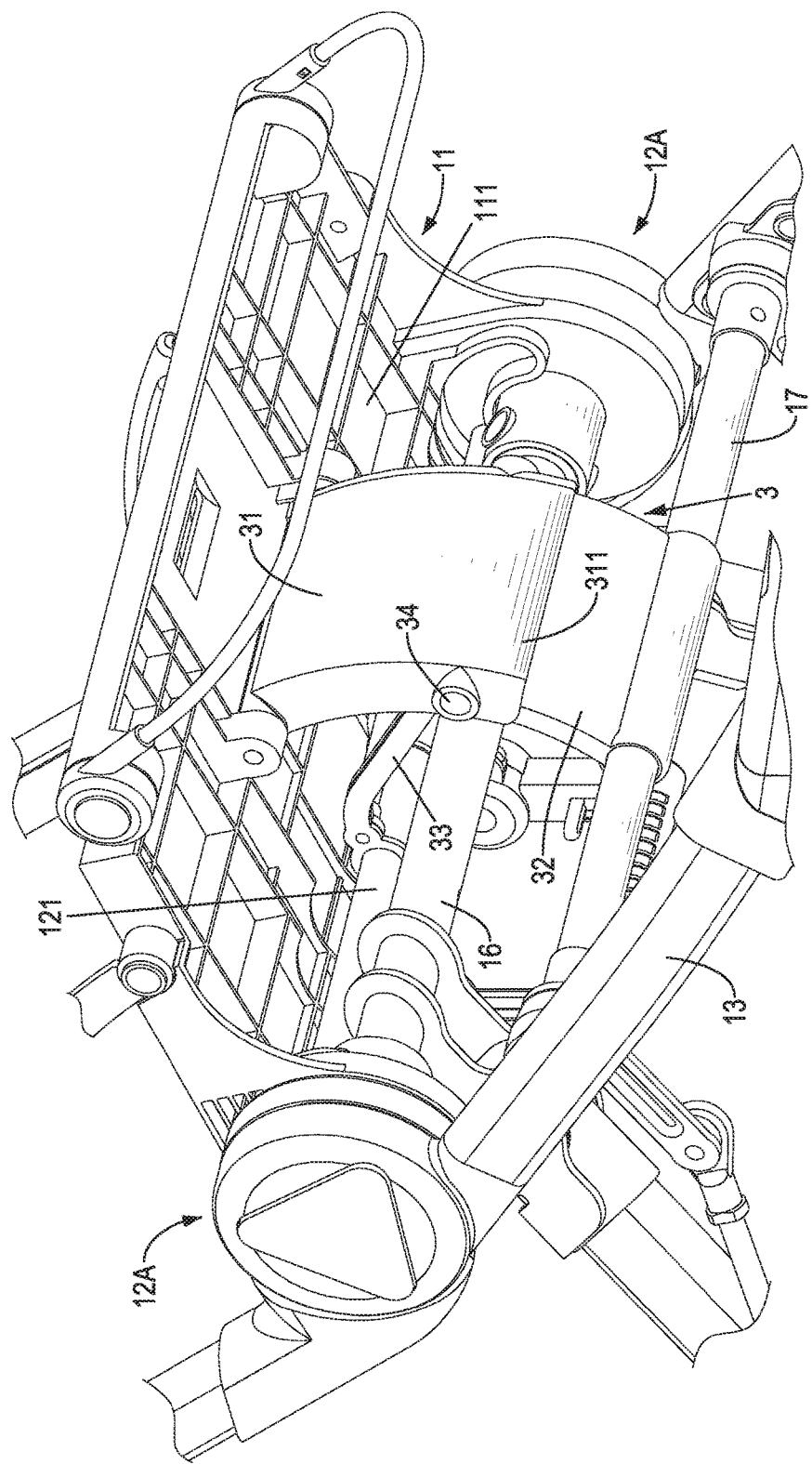
FIG. 4 is an enlarged bottom perspective view of the stroller frame in FIG. 1.
Figure 5:
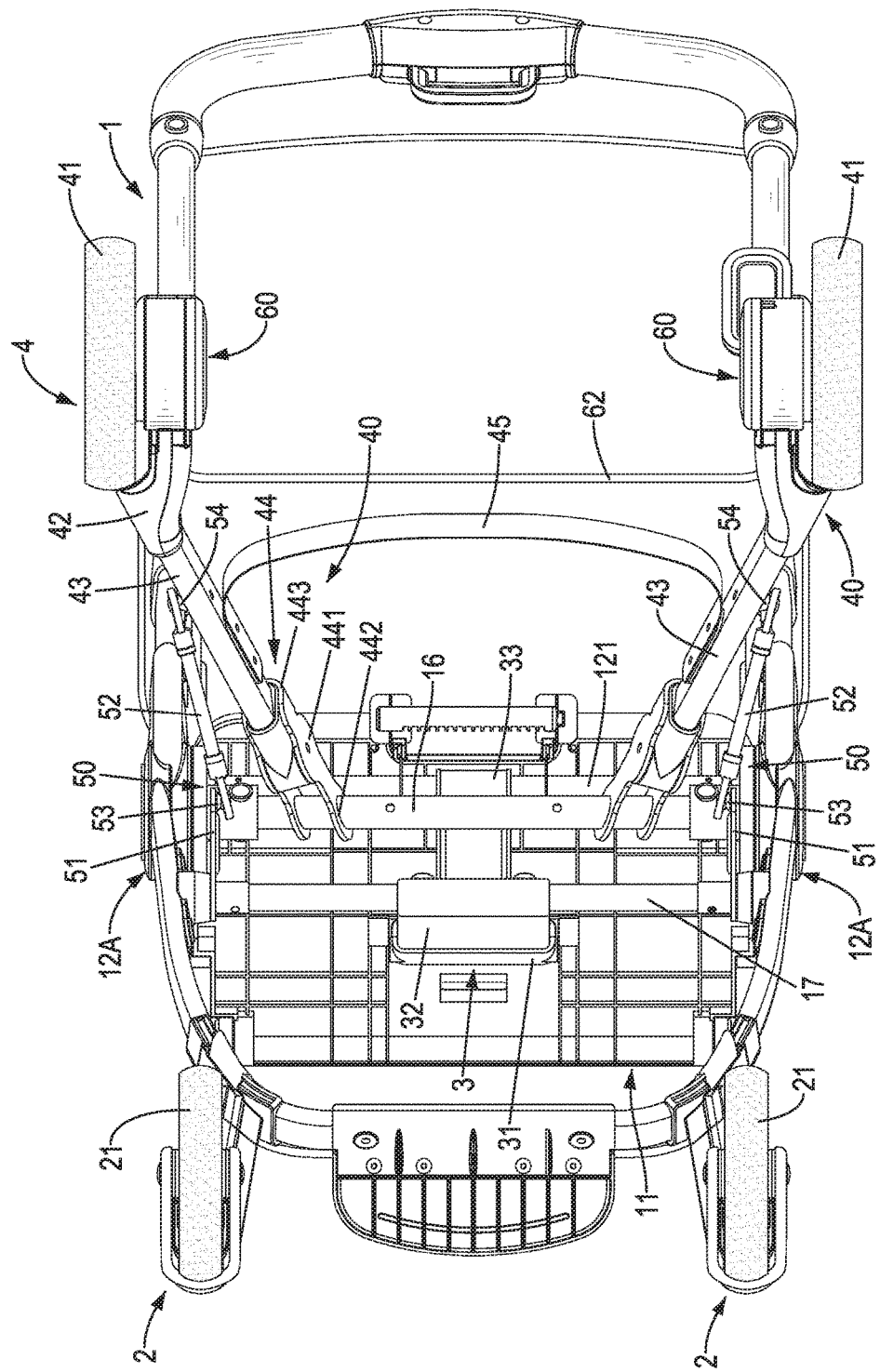
FIG. 5 is a bottom side view of the stroller frame in FIG. 1.
Figure 6:
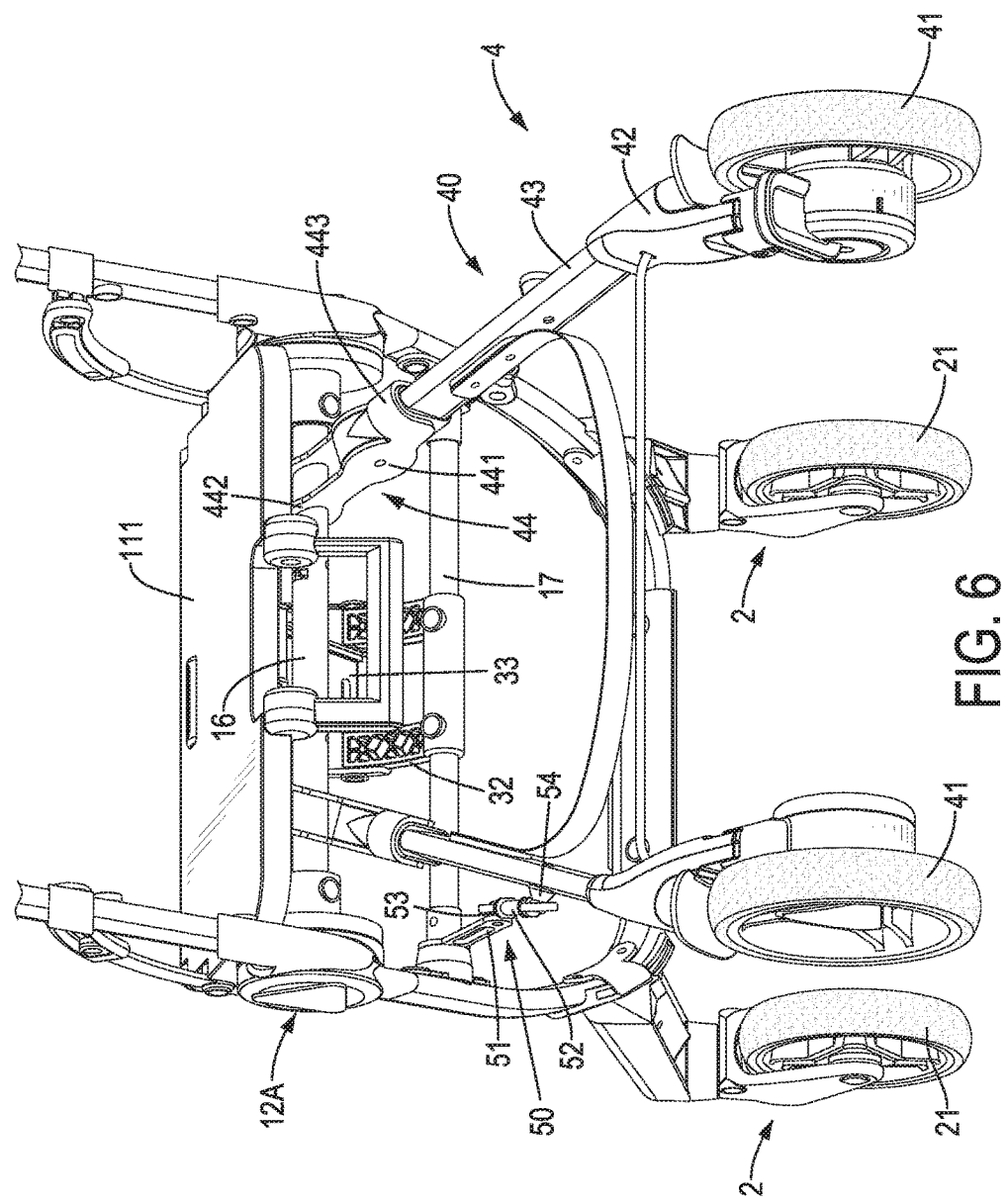
FIG. 6 is an enlarged rear side view of the stroller frame in FIG. 1.
Figure 7:
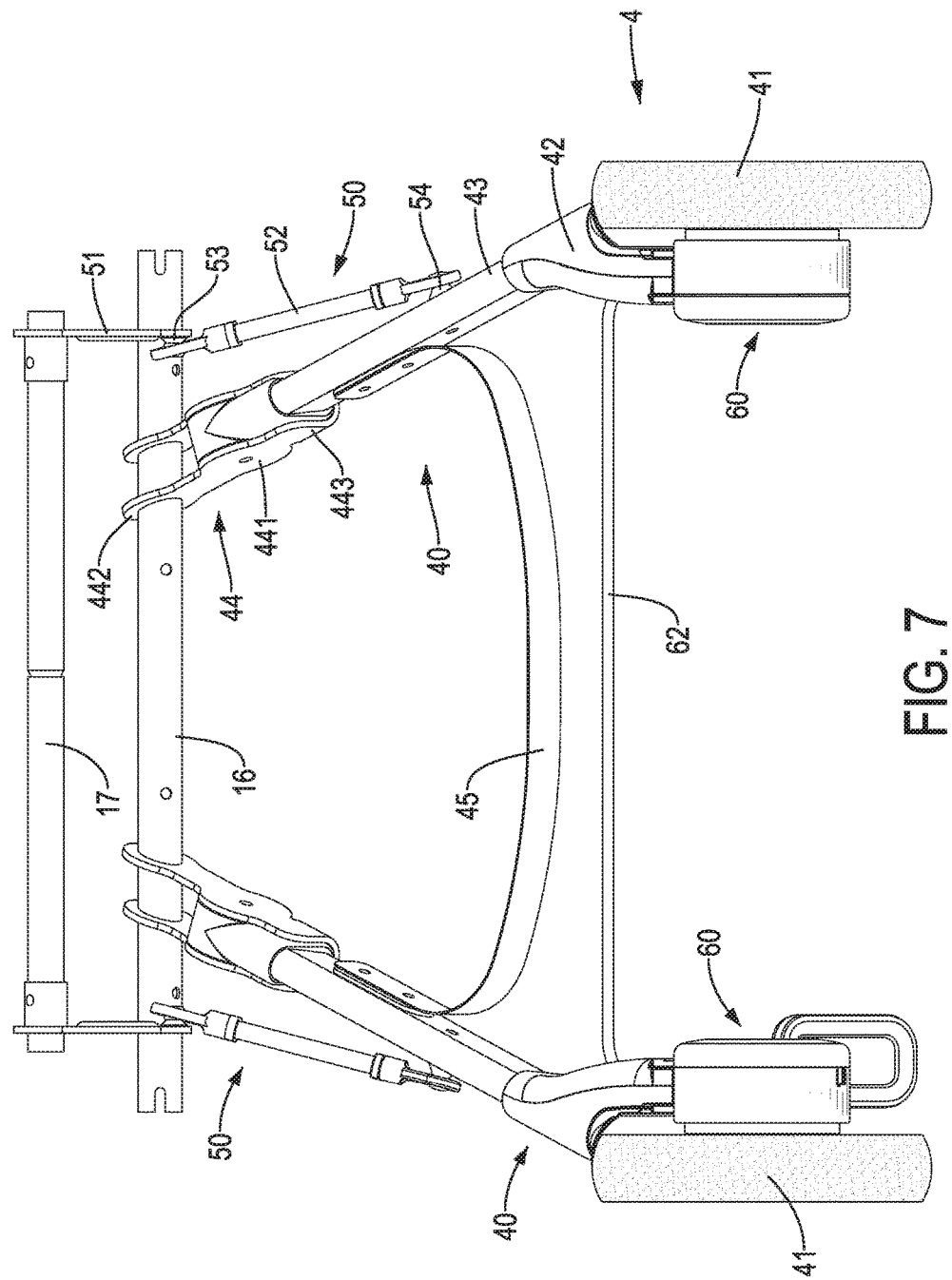
FIG. 7 is an enlarged bottom side view of the stroller frame in FIG. 1.

With reference to FIGS. 1 to 3, when the stroller frame is expanded, the inclined rods 13 of the body 1 are extended upwardly by the two first joint assemblies 12A. The handle 14 is extended upwardly by the two second joint assemblies 12B. The two retractable supporting assemblies 18 are respectively extended and provide stable supporting strength to the seat plate 111 by the seat supporting bracket 11. The body 1 is in a steady expanded state.

With reference to FIGS. 1 to 6, when the stroller frame is expanded, the rear wheel folding mechanism 4 is located at a back of the body 1. The two rear wheel assemblies 40 of the rear wheel folding mechanism 4 are extended backwardly. The two connecting rods 43 are respectively guided by the two connecting seats 44 to extend backwardly and outwardly. The distance between the two rear wheels 41 is larger than the distance between the two front wheels 21. The two linkage assemblies 50 are connected to two ends of the second transverse rod 17 and the middle sections of the connecting rods 43 of the two rear wheel assemblies 40 to form an extended state and support the connecting rods 43. In each rear wheel assembly 40, the stopping portion 443 located at a rear side of a bottom end of the connecting seat 44 abuts a corresponding connecting rod 43 for positioning and support.

In addition, the seat supporting mechanism 3 is located on the body 1 and is connected to a bottom section of the seat plate 111, the linkage shaft 121, the first transverse rod 16, and the second transverse rod 17. The limiting portion 311 on the bottom end of the first arc-shaped plate 31 is located on the top end of the second arc-shaped plate 32 for stopping and limiting to form a foldable multi-point supporting mechanism to provide stable auxiliary strength to the seat plate 111. The rear wheel folding mechanism 4 is expanded steadily. The stroller frame can be pushed and moves steadily.

Figure 8:
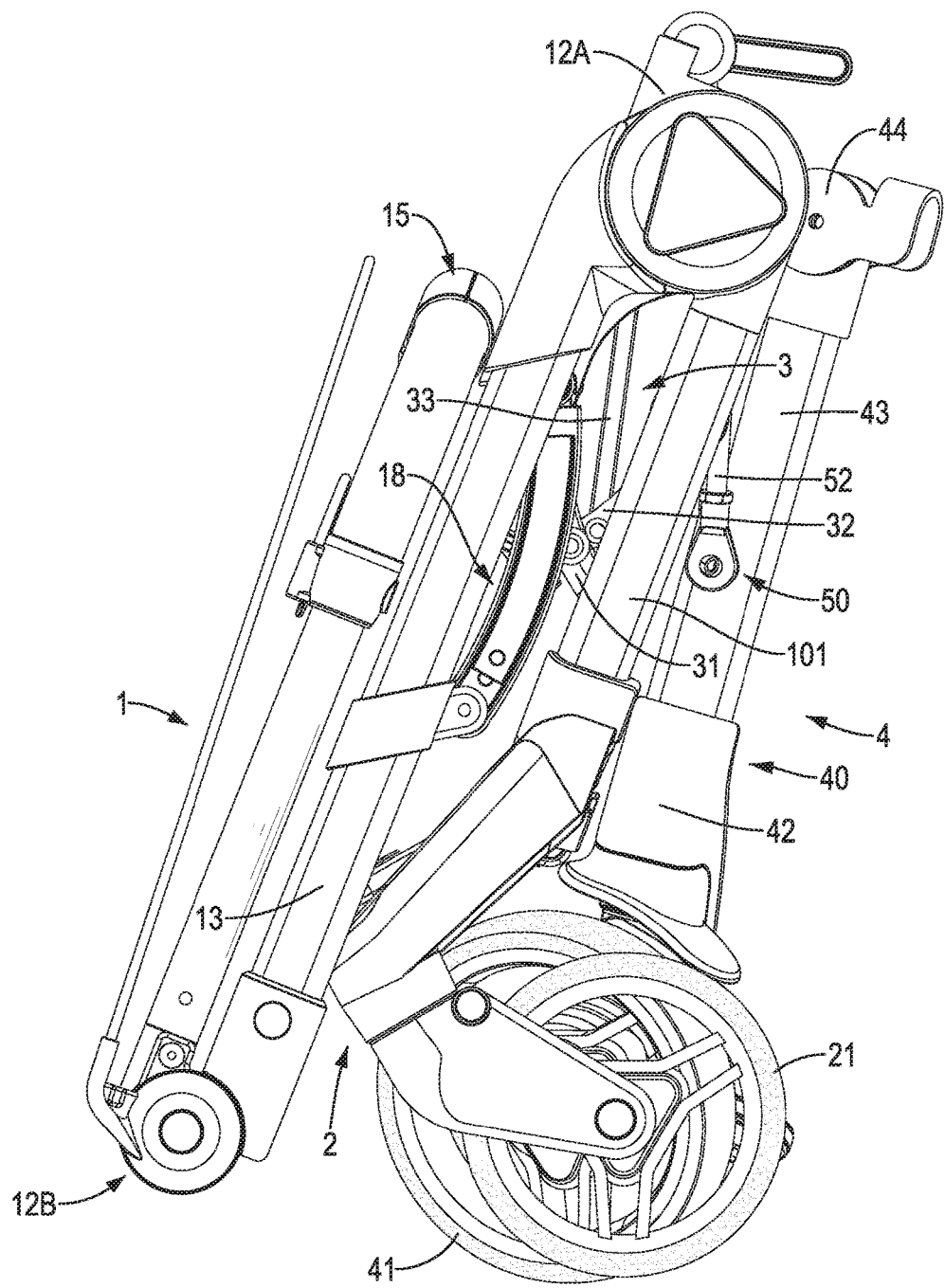
FIG. 8 is a side view of the stroller frame in FIG. 1, showing the stroller frame being folded.
Figure 9:
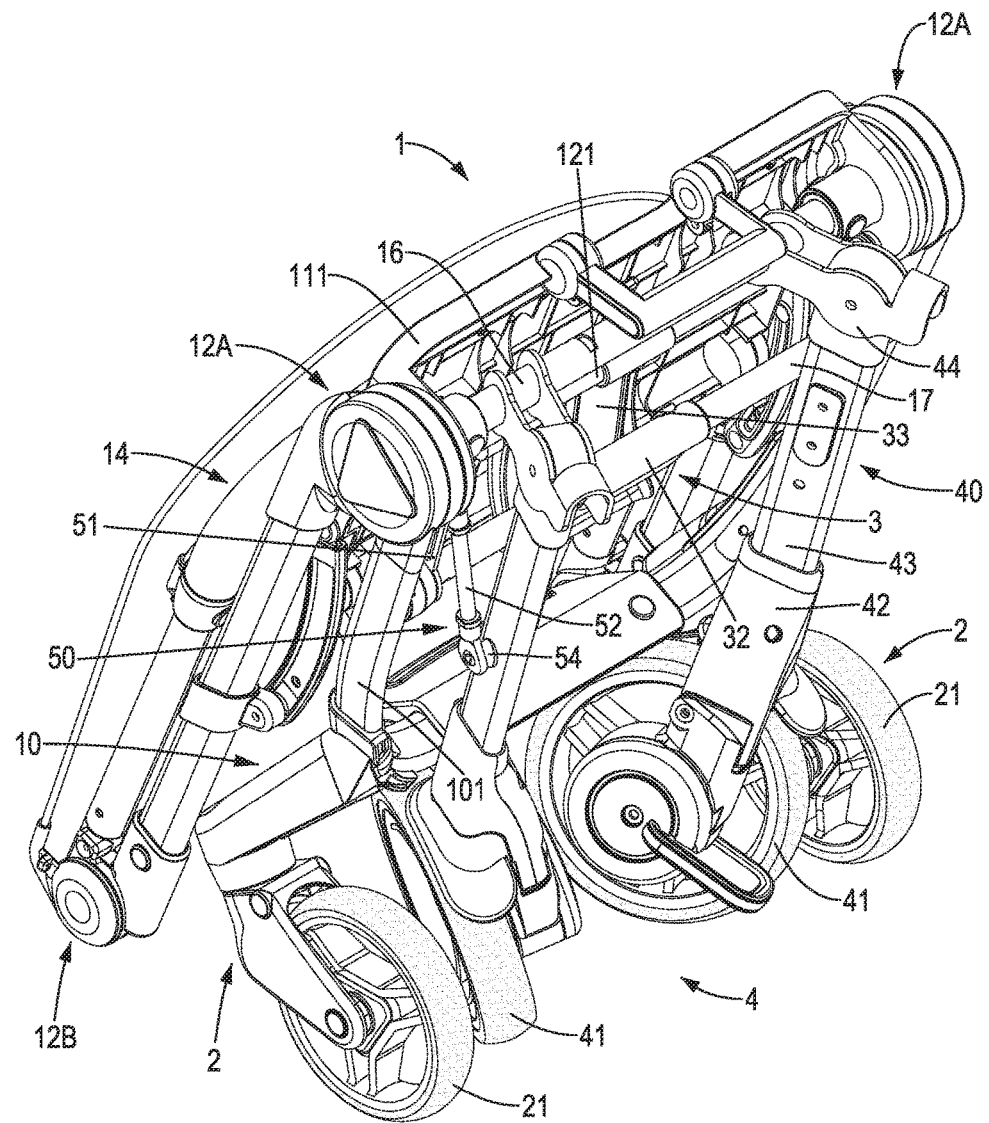
FIG. 9 is a rear perspective view of the stroller frame in FIG. 1, showing the stroller frame being folded.
Figure 10:
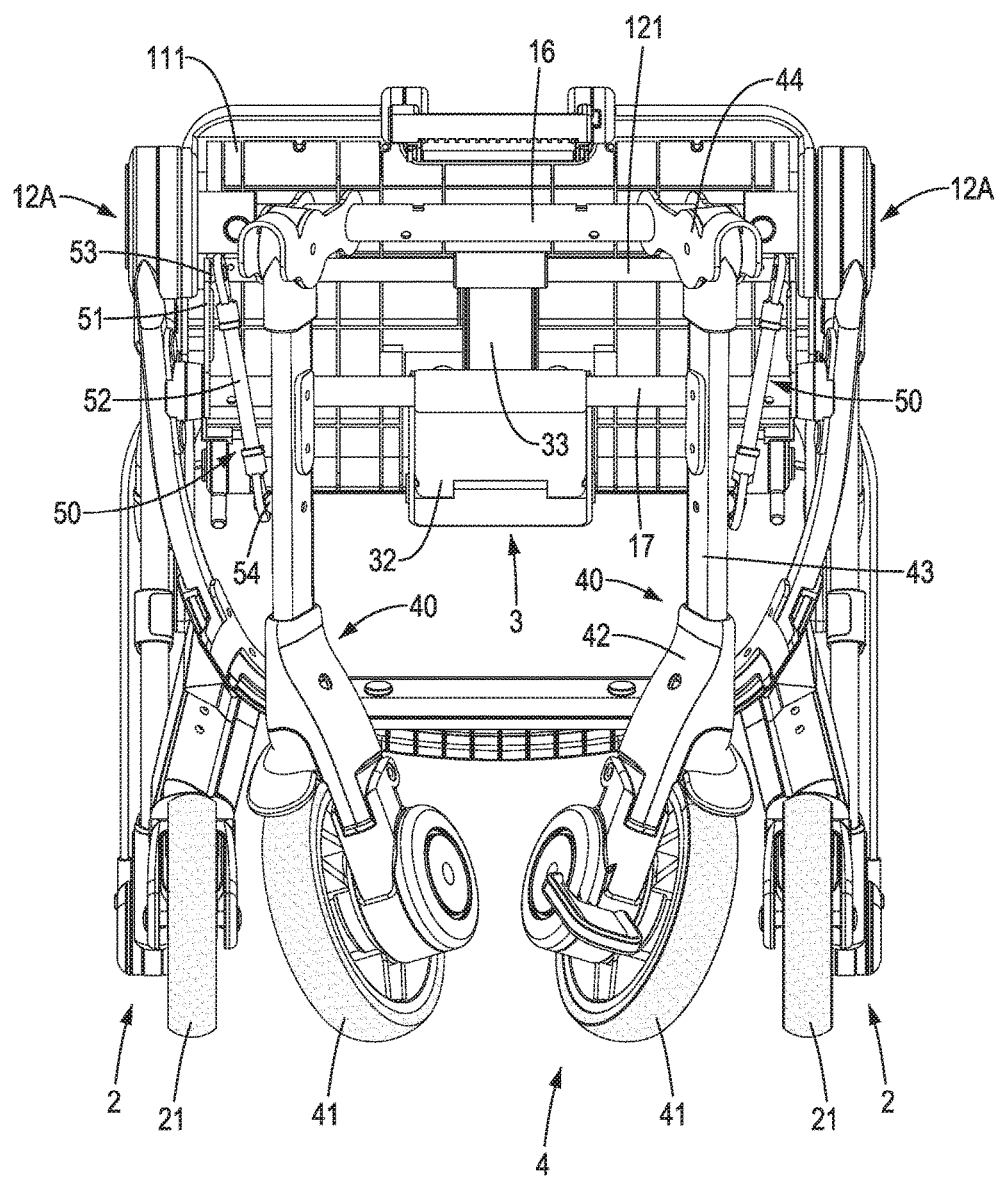
FIG. 10 is a rear side view of the stroller frame in FIG. 1, showing the stroller frame being folded.

With reference to FIGS. 8 to 10, when the stroller frame is folded, the two first joint assemblies 12A and the two second joint assemblies 12B can be shifted to a foldable state by the operating assembly 15 of the handle 14. The two inclined rods 13 of the body 1 can be folded forwardly by the two first joint assemblies 12A, and are moved to combine with the two top portions 101 of the front wheel bracket 10. The handle 14 is folded reversely by the two second joint assemblies 12B. The two inclined rods 13 are moved close to each other. In a folding process of the body 1, the seat supporting mechanism 3 is driven by the two first joint assemblies 12A located at the two sides of the linkage shaft 121 of the body 1 for pulling the seat supporting mechanism 3 to fold by the supporting plate 33. The first arc-shaped plate 31, the second arc-shaped plate 32, and the supporting plate 33 are in a folded state.

Furthermore, the rear wheel folding mechanism 4 is folded by the two linkage assemblies 50 and drives the connecting rods 43 of the two rear wheel assemblies 40 to respectively rotate along the pivoting pins of the pivoting portions 441 of the connecting seats 4 for moving close to the front wheel bracket 10. In each one of the two linkage assemblies 50, the first multi-directional connector 53 is connected to the first linkage rod 51 and the second linkage rod 52. The second multi-directional connector 54 is connected to the second linkage rod 52 and a corresponding one of the two connecting rods 43. When the two rear wheel assemblies 40 are folded, the connecting rods 43 are guided and move toward a middle direction of the rear wheel folding mechanism 4. The two rear wheels 41 can move to be disposed between the two front wheels 21. The overall width and volume of the folded stroller frame are decreased.

What is claimed is:
1. A stroller frame comprising:
 a body having
  a front end having two sides;
  a rear side;
  a front wheel bracket having
   a front;
   a rear;
   a top; and
   two top portions disposed at a spaced interval and inclined toward the top of the front wheel bracket from the front of the front wheel bracket to the rear of the front wheel bracket;
  two first joint assemblies respectively disposed on the two top portions of the front wheel bracket;
  a seat supporting bracket disposed on the two first joint assemblies;
  a seat plate disposed on the seat supporting bracket and having a middle section and a rear section;
  two inclined rods respectively disposed on the two first joint assemblies;
  two second joint assemblies respectively disposed on the two inclined rods;
  a handle disposed across the two second joint assemblies and having
   two longitudinal portions respectively disposed on the two second joint assemblies; and
   a transverse portion disposed across the two longitudinal portions and having an operating assembly disposed on the transverse portion, wherein the operating assembly controls the two first joint assemblies and the two second joint assemblies;
  a first transverse rod disposed across the two first joint assemblies below the seat supporting bracket;
  a second transverse rod disposed across the two top portions of the front wheel bracket below the seat supporting bracket, parallel with the first transverse rod, located ahead and below the first transverse rod, and having two ends; and a linkage shaft disposed below the rear section of the seat plate, and linkingly connected between the two first joint assemblies;

two front wheel assemblies respectively and pivotally disposed on the two sides of the front end of the body, and each front wheel assembly having
a front wheel seat pivotally disposed on the body; and
a front wheel pivotally disposed on the front wheel seat;

a seat supporting mechanism moveably disposed below the seat plate of the body, and having a first arc-shaped plate, a second arc-shaped plate, and a supporting plate, a top end of the first arc-shaped plate pivotally disposed on the middle section of the seat plate, a bottom end of the second arc-shaped plate pivotally disposed on the second transverse rod, a top end of the supporting plate connected to the linkage shaft, and a bottom end of the first arc-shaped plate, a top end of the second arc-shaped plate, and a bottom end of the supporting plate connected with each other by a pivoting shaft; and a rear wheel folding mechanism disposed on the rear side of the body, and having
two rear wheel assemblies moveably disposed on the first transverse rod of the body, and each rear wheel assembly having
a rear wheel seat having a top portion and a side;
a rear wheel having a wheel shaft pivotally disposed on the side of the rear wheel seat, and the wheel shaft having a longitudinal direction and a central line defined along the longitudinal direction of the wheel shaft;
a connecting rod securely disposed on the top portion of the rear wheel seat and having a longitudinal direction, a central line defined along the longitudinal direction of the connecting rod, and a top end, wherein an angle is defined between the central line of the connecting rod and the central line of the wheel shaft and is an acute angle; and
a connecting seat pivotally disposed on the top end of the connecting rod, obliquely and securely mounted on the first transverse rod, and having
a pivoting portion pivotally disposed on the top end of the connecting rod by a pivoting pin and having a top end and a bottom end;
a fixing portion formed on the top end of the pivoting portion, and the connecting seat securely mounted on the first transverse rod by the fixing portion; and
a stopping portion formed on the bottom end of the pivoting portion and located behind the top end of the connecting rod for limiting a backward rotating angle between the connecting rod and the connecting seat;
wherein the connecting seats of the two rear wheel assemblies are inclined outwardly from top to bottom of the body, and the two connecting rods are symmetrical and are splayed from top to bottom of the body, when the two rear wheel assemblies are expanded, a distance between the two rear wheels is larger than a distance between the two front wheels, and when the two rear wheel assemblies are folded, the two rear wheels move between the two front wheels by the connecting seats inclined and the two connecting rods splayed; and
two linkage assemblies respectively disposed on the two ends of the second transverse rod, and respectively located at outer sides of the connecting rods and connected to the connecting rods of the two rear wheel assemblies, and each linkage assembly having
a first linkage rod, a second linkage rod, a first multi-directional connector, and a second multi-directional connector, an end of the first linkage rod connected to the second transverse rod, the other end of the first linkage rod combined to the first multi-directional connector to connect to an end of the second linkage rod, and the other end of the second linkage rod combined to the second multi-directional connector to connect to a middle section of a corresponding one of the connecting rods.

2. The stroller frame as claimed in claim 1, wherein the first arc-shaped plate has a limiting portion, the limiting portion is disposed on the bottom end of the first arc-shaped plate, is located below the pivoting shaft, and is located at an outer side of the top end of the second arc-shaped plate.

3. The stroller frame as claimed in claim 2, wherein the body has two retractable supporting assemblies, and each retractable supporting assembly is connected between one of the two inclined rods and the seat supporting bracket and has a first supporting rod and a second supporting rod, the first supporting rod and the second supporting rod are curved rods, an end of the first supporting rod is pivotally disposed on a corresponding one of the two inclined rods, an arc-shaped elongated hole is formed through a side surface of the first supporting rod, an end of the second supporting rod is pivotally disposed on a side of the seat supporting bracket, the other end of the second supporting rod is moveably connected to the other end of the first supporting rod, and a limiting element is disposed on the other end of the second supporting rod and is inserted into the arc-shaped elongated hole for limiting a relative moving distance between the first supporting rod and the second supporting rod.

4. The stroller frame as claimed in claim 3, wherein the front wheel bracket has two front portions, the two front portions are disposed on the front of the front wheel bracket, and the two front wheel seats of the two front wheel assemblies are respectively and pivotally disposed on the two front portions of the front wheel bracket.

5. The stroller frame as claimed in claim 1, wherein the stroller frame has a flexible strap, and two ends of the flexible strap are respectively connected to the middle sections of the connecting rods of the two rear wheel assemblies.

6. The stroller frame as claimed in claim 2, wherein the stroller frame has a flexible strap, and two ends of the flexible strap are respectively connected to the middle sections of the connecting rods of the two rear wheel assemblies.

7. The stroller frame as claimed in claim 3, wherein the stroller frame has a flexible strap, and two ends of the flexible strap are respectively connected to the middle sections of the connecting rods of the two rear wheel assemblies.

8. The stroller frame as claimed in claim 4, wherein the stroller frame has a flexible strap, and two ends of the flexible strap are respectively connected to the middle sections of the connecting rods of the two rear wheel assemblies.

9. The stroller frame as claimed in claim 5, wherein the stroller frame has two locking devices, the two locking devices are respectively disposed on the rear wheel seats of the two rear wheel assemblies for selectively locking the two rear wheels, a cable is connected to the two locking devices to link the two locking devices, and a pedal is disposed on one of the two locking devices for controlling the two locking devices.

10. The stroller frame as claimed in claim 6, wherein the stroller frame has two locking devices, the two locking devices are respectively disposed on the rear wheel seats of the two rear wheel assemblies for selectively locking the two rear wheels, a cable is connected to the two locking devices to link the two locking devices, and a pedal is disposed on one of the two locking devices for controlling the two locking devices.

11. The stroller frame as claimed in claim 7, wherein the stroller frame has two locking devices, the two locking devices are respectively disposed on the rear wheel seats of the two rear wheel assemblies for selectively locking the two rear wheels, a cable is connected to the two locking devices to link the two locking devices, and a pedal is disposed on one of the two locking devices for controlling the two locking devices.

12. The stroller frame as claimed in claim 8, wherein the stroller frame has two locking devices, the two locking devices are respectively disposed on the rear wheel seats of the two rear wheel assemblies for selectively locking the two rear wheels, a cable is connected to the two locking devices to link the two locking devices, and a pedal is disposed on one of the two locking devices for controlling the two locking devices.

* * * * *